United States Patent [19]

Raidel

[11] Patent Number: 5,127,668
[45] Date of Patent: Jul. 7, 1992

[54] TORQUE BEAM WITH CLAMPED MONO-PIVOT BUSHING AND FLEXIBLE AXLE SEAT

[76] Inventor: John E. Raidel, Rte. 9, Box 400-M, Springfield, Mo. 65804

[21] Appl. No.: 645,505

[22] Filed: Jan. 24, 1991

[51] Int. Cl.⁵ ............................................. B60G 11/26
[52] U.S. Cl. ...................................... 280/711; 280/683
[58] Field of Search ................................ 280/711–713, 280/688, 725, 718, 683, 678; 180/905

[56] References Cited

U.S. PATENT DOCUMENTS

| | | | |
|---|---|---|---|
| 3,801,086 | 4/1974 | Raidel | 280/713 |
| 4,166,640 | 9/1979 | Van Denberg | 280/711 |
| 4,261,597 | 4/1981 | Vanderberg | 280/711 |
| 4,902,035 | 2/1990 | Raidel | 280/713 |
| 5,002,305 | 3/1991 | Raidel | 280/713 |

Primary Examiner—Charles A. Marmor
Assistant Examiner—Paul Dickson
Attorney, Agent, or Firm—Rogers, Howell & Haferkamp

[57] ABSTRACT

A torque beam assembly is provided with a bushing clamp assembly at one end and an axle seat assembly at a second end that reduce the torsional stress exerted on the torque beam during normal suspension operation of a vehicle employing the torque beam assembly. The bushing clamp is formed as a cylinder having a slot through one side of the cylinder wall that is resiliently biased open to facilitate the insertion of a pivot bushing into the cylinder and the removal of the bushing from the cylinder. The pivot bushing is provided with troughs in its end walls and cavities that extend into the bushing from the troughs that together reduce torsional twisting stress exerted on the torque beam. The axle seat assembly is provided with inboard and outboard side plates that each have first ends connected to the torque beam and second ends that are flared outward and spaced further apart from each other than are the first ends. The second ends of the side plates are connected to the vehicle axle by either welds or U-bolt connections. The flared portions of the inboard and outboard side plates enable flexing of the axle seat assembly and reduce the torsional stress exerted on the torque beam in normal suspension system operations.

16 Claims, 3 Drawing Sheets

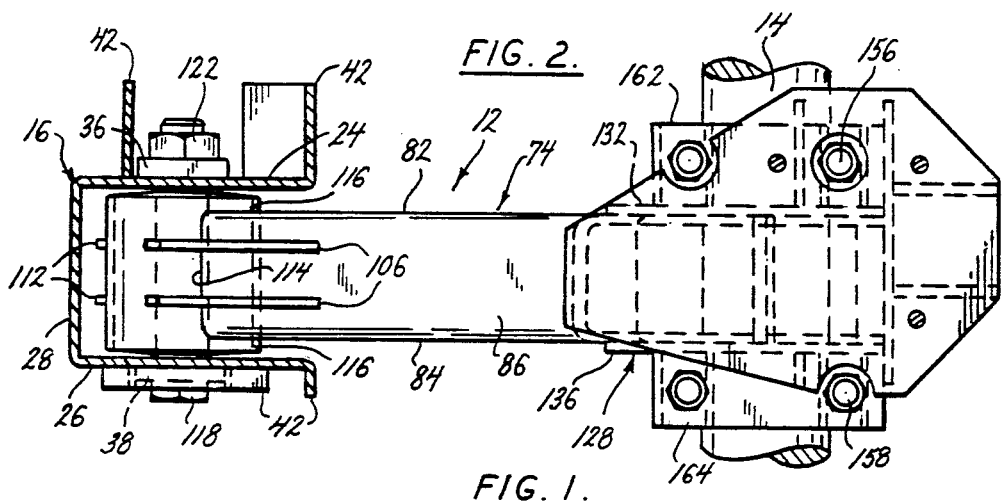

TORQUE BEAM WITH CLAMPED MONO-PIVOT BUSHING AND FLEXIBLE AXLE SEAT

BACKGROUND OF THE INVENTION

(1) Field of the Invention

The present invention relates to a torque beam assembly for a vehicle suspension system. In particular, the present invention relates to a vehicle suspension system torque beam having a resilient pivot bushing clamp at one end and a flexible axle seat assembly at its other end. The bushing clamp is clamped over a pivot bushing having recesses in its end walls that enable operative movement of the torque beam on the bushing while reducing the torsional stress on the torque beam caused by the movement. The axle seat assembly provides a flexible connection between the vehicle axle and the torque beam without the use of additional bushings to connect the axle seat to the torque beam.

(2) Description of the Related Art

Suspension systems of the type provided by the present invention are connected at opposite sides of a vehicle to the underside of the vehicle chassis. The systems connect an axle of the vehicle to the chassis. The suspension systems on opposite sides of the vehicle are in most cases identical. One of the pair of suspension systems comprises a hanger member, a torque beam, an axle seat, and an air spring.

The hanger member is connected to the underside of the vehicle chassis and depends downward from the chassis. The hanger member supports a pivot bushing that pivotally mounts the torque beam to the hanger member.

A first end of the torque beam is connected to the pivot bushing, thereby providing the pivoting connection between the torque beam and the hanger member. The connection to the bushing also permits limited torsional twisting of the torque beam relative to the hanger member. The second end of the torque beam is connected to the axle seat that supports the vehicle axle.

The axle seat is commonly connected to the second end of the torque beam by a pair of bushings that permit limited torsional twisting of the axle seat relative to the torque beam. The air spring is generally provided between the axle seat and the vehicle chassis. A shock absorber is also generally provided between the chassis and the axle seat.

The bushing connections between the torque beam and the hanger member, and between the torque beam and the axle seat supporting the vehicle axle, enable limited movement of the vehicle axle relative to the torque beam without imparting sufficient torsional stress on the torque beam to damage the beam.

Torque beams of suspension systems of the type described above are generally pivotally connected to the hanger members by a pivot bushing assembly. Prior art torque beams are often provided with a hole through their first end, opposite their second end connected to the axle seat. The bushing assembly is press fit into the hole to provide a secure friction connection between the exterior of the bushing assembly and the torque beam. The first end of the torque beam, along with the inserted bushing, is then positioned between the side walls of the hanger member. A bolt is inserted through aligned holes in one side wall of the hanger member, through the bushing center, and in the opposite side wall of the hanger member. The bolt is then secured by a nut to pivotally mount the torque beam to the hanger member by the pivot bushing.

When the torque beam requires replacement or repair, or when the pivot bushing requires replacement due to wear, the torque beam must first be removed from the hanger member and the bushing removed from the torque beam. This requires removing the nut and bolt fastener connecting the bushing assembly to the hanger and removing the torque beam together with the bushing from the hanger. The bushing assembly is then removed from the hole extending through the first end of the torque beam by pressing the bushing completely through the hole. This procedure is time consuming and often damages the bushing as it is removed from the torque beam, preventing the bushing from being reused when the suspension system is reassembled.

The procedure for removing the bushings that mount the axle seat to the second end of the torque beam is often substantially the same as the procedure for removing the bushing assembly at the first end of the torque beam. Once nut and bolt fasteners extending through the opposite sides of the axle seat and through the centers of the bushing assemblies are removed, the axle seat is removed from the second end of the torque beam. The bushings are then removed from holes extending through the second end of the torque beam by being pressed through the holes. This procedure is also time consuming and often damages the bushing assemblies as they are removed, preventing their reuse when the suspension system is reassembled. The periodic replacement of the bushing assemblies connecting the first end of the torque beam to the hanger member, and connecting the axle seat assembly to the second end of the torque beam, and the time spent to make these replacements, represent a significant portion of the maintenance costs for vehicle suspension systems of this type.

The torque beam assembly of the present invention reduces the costs involved in maintaining a vehicle suspension system by providing a unique torque beam construction that reduces the time required to remove a pivot bushing assembly connecting the torque beam to a hanger member from the first end of the torque beam without damaging the bushing assembly. The torque beam also reduces the number of bushings required for a vehicle suspension assembly by providing a unique axle seat assembly that is connected directly to the second end of the torque beam without the use of additional bushings. The torque beam assembly is also provided with an improved pivot bushing construction that facilitates the torsional twisting of the torque beam during normal suspension system operation while reducing torsional stresses on the torque beam. The torque beam assembly requires only the single pivot bushing assembly connecting the torque beam to a hanger member, yet functions in a manner equivalent to prior art suspension systems employing torque beams with second and third bushing assemblies connecting the axle seat assembly to the second end of the torque beam.

It is therefore an object of the present invention to provide an improved torque beam assembly for vehicle suspension systems which provides an improved pivot bushing assembly that reduces torsional twisting stress in the torque beam during operation, a pivot bushing clamp at a first end of the torque beam that enables removing the pivot bushing from the torque beam in a reduced amount of time and without damaging the bushing, and an improved axle seat assembly connected at the second end of the torque beam that is capable of flexing relative to the second end of the torque beam during normal suspension system operation yet uses no additional bushing assemblies to connect the axle seat to the torque beam.

SUMMARY OF THE INVENTION

The torque beam assembly is generally comprised of a torque beam, a pivot bushing assembly connected to a first end of the torque beam, and an axle seat assembly connected at the second end of the torque beam. The assembly is employed in pairs of the assembly, each being mounted in suspension systems of the vehicle on opposite sides of the vehicle chassis. The suspension systems on the opposite sides of the vehicle chassis each included a hanger member suspended downward from the vehicle chassis. Each hanger member has inboard and outboard side walls. The pivot bushing of the torque beam assembly is mounted between the side walls of a hanger member by a nut and bolt fastener that extends through aligned holes in one side wall, the center of the bushing assembly, and the other side wall.

The pivot bushing is constructed of a resilient material having a cylindrical configuration and opposite end walls. An axial bore extends completely through the center of the cylinder between its opposite end walls. A cylindrical metal sleeve is inserted through the center bore of the cylinder and a cylindrical metal sleeve is provided around the circumference of the cylinder. In alternate embodiments of the bushing, the cylindrical metal sleeve around the circumference of the cylinder may be omitted.

Pairs of arcuate trough recesses are provided in the opposite end walls of the cylinder. The trough recesses are positioned in the cylinder end walls on opposite sides of the center bore extending between the end walls. In the bottom of each trough recess, three cavity cells are provided that extend further into the pivot bushing cylinder from the end walls. This unique construction of the pivot bushing reduces the torsional stress on the torque beam as it is flexed in operation of the vehicle suspension system.

Each torque beam has first and second ends with a pivot bushing clamp being connected to the first end of the torque beam. The pivot bushing clamp is essentially configured as a plate or strip of metal that has been shaped into the configuration of a cylinder. The cylinder clamp may also be formed by casting, or by welding two identical semi-circular halves of the cylinder together. An axial slot extends through a side of the cylinder, forming two ends of the cylinder wall that are separated from each other by the slot. Flanges are provided on the opposite ends of the cylinder wall and extend outward from the slot. Forming the clamp as a cylinder gives it a resiliency that biases the slot open.

The resiliency of the cylinder opening the slot enables the pivot bushing to be easily inserted into the interior of the cylinder. By then closing the slot by engaging the flanges of the cylinder against each other, the cylinder closes over the circumference of the pivot bushing and securely mounts the first end of the torque beam to the exterior of the bushing. Aligned holes are provided through the flanges and threaded fasteners are inserted through the aligned holes and are tightened down to engage the flanges against each other, substantially closing the cylinder slot, and securely engaging the bushing clamp over the circumference of the pivot bushing.

With the pivot bushing so mounted to the first end of the torque beam, the first end of the torque beam and the pivot bushing are then inserted between the opposed inboard and outboard side walls of the hanger member, aligning the central bore of the pivot bushing with aligned holes in the side walls of the hanger member. A thread fastener is then inserted through the aligned holes of the hanger member and the central bore of the pivot bushing to pivotally mount the torque beam to the hanger member.

An axle seat assembly is connected to the second end of each of the torque beams. The axle seat assembly is essentially comprised of a pair of side plates. Each of the side plates have first and second ends that are separated by a bend extending transversely across the side plate. The bend staggers the first and second ends of the side plate so that the first and second ends of each side plate are parallel but not coplanar.

The first ends of the side plates are secured to opposite inboard and outboard sides of the torque beam by welds. The second ends of the side plates project away from the torque beam. In an embodiment of the torque beam assembly that supports an underslung vehicle axle, the second ends of the side plates project downward from the torque beam. In an alternate embodiment of the torque beam assembly that supports an overslung vehicle axle, the second ends of the side plates project upward from the torque beam. In both embodiments of the invention, the first ends of the side plates are secured to the torque beam in a position that spaces the second ends of the side plates further apart from each other than the first ends of the side plates.

The first ends of the side plates have distal edges remote from the second ends of the side plates. Each of the side plates are connected to the torque beam by welds between the distal edges of the first ends of the side plates and the torque beam. The second ends of the side plates are connected to the vehicle axle either by U-bolts or by welds between the second ends of the side plates and the axle. The weld connection between the distal edges of the first ends of the side plates and the torque beam, along with the transverse bend provided through each of the side plates, enables the side plates to flex relative to the torque beam during suspension system operation. The flexing of the side plates enable the axle seat assembly of the invention to function in much the same manner as prior art axle seat assemblies requiring one or two additional bushings to connect the axle seat assembly to the torque beam.

Working together, the pivot bushing and axle seat assembly of the torque beam assembly reduce the torsional stress exerted on the torque beam due to movement of the vehicle axle relative to the torque beam during suspension system operation, without requiring additional bushings to connect the axle seat assembly to the torque beam.

BRIEF DESCRIPTION OF THE DRAWINGS

Further objects and features of the present invention are revealed in the following detailed description of the preferred embodiment of the invention and in the drawing figures wherein:

FIG. 1 is a side elevation view of a vehicle suspension system employing the torque beam assembly of the present invention supporting an underslung vehicle axle;

FIG. 2 is a plan view of the torque beam assembly taken along the line 2—2 of FIG. 1;

FIG. 3 is an elevation view in section of the axle seat assembly of the invention taken along the line 3—3 of FIG. 1;

FIG. 4 is an elevation view in section of the pivot bushing of the present invention;

DESCRIPTION OF THE PREFERRED EMBODIMENT

Figure 6:
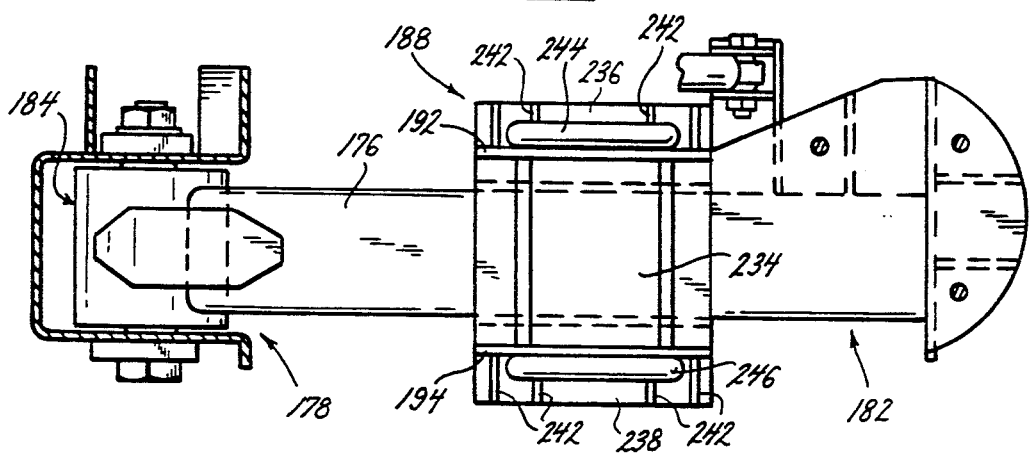
FIG. 6 is a plan view of the torque beam FIG. 5.

The torque beam assembly 12 of the present invention is shown in FIG. 1 supporting an underslung vehicle axle 14. The torque beam assembly is shown employed in a suspension system comprising a hanger member 16 and an air spring 18 connecting the torque beam assembly to the vehicle chassis. It should be understood by those skilled in the art that the suspension system described with reference to the drawing figures is only one-half of a complete suspension system, and that a suspension system like that shown in the drawing figures is mounted to the vehicle chassis on the opposite side of the vehicle.

The hanger member 16 is secured to the underside of a vehicle chassis member 22. The hanger member is generally comprised of inboard 24 and outboard 26 side walls that are laterally spaced from each other and are connected by an integral end wall 28. Aligned holes 32, 34 are provided through the inboard and outboard side walls 24, 26 of the hanger member. The holes are provided to mount the pivot bushing of the torque beam assembly in a manner to be described. Reinforcing plates 36, 38 are welded to the side walls 24, 26 of the hanger member. The reinforcing plates have center holes that are aligned with the holes 32, 34 of the side walls. Additional reinforcing gusset plates 42 are provided on the side walls of the hanger member and surrounding the reinforcing plates 36, 38.

The mono-pivot bushing assembly 44 of the present invention is best seen in FIGS. 1 and 4. The pivot bushing assembly 44 is comprised of a cylinder 46 of resilient material such as rubber, although other materials may be employed. The resilient material 46 has a cylindrical outer circumference 48 and opposite end walls 52, 54. A central bore 56 extends axially through the center of the cylinder of resilient material and a cylindrical metal sleeve 58 is inserted through the center bore. An outer cylindrical metal sleeve 60 is provided around the outer circumference 48 of the resilient material. In alternate embodiments of the pivot bushing the outer metal sleeve 60 may be omitted.

Pairs of arcuate trough recesses 62, 64, 66, 68 are provided in the opposite end walls 52, 54 of the bushing cylinder 46. The trough recesses are positioned in the end walls on opposite sides of the center bore 56 through the cylinder 46. From each of the trough recesses 62, 64, 66, 68, three cavity cells 72 extend further into the resilient material 46 of the pivot bushing. By providing the pairs of trough recesses and the cavity cells in the opposite end walls 52, 54 of the cylinder of resilient material 46, the mono-pivot bushing assembly 44 of the present invention exerts less resistance against torsional twisting of the torque beam than do conventional pivot bushings and thereby reduces the torsional stress on the torque beam during suspension system operation.

The torque beam 74 of the assembly is provided with first and second ends 76, 78 on the left and right sides of the torque beam, respectively, as viewed in FIGS. 1 and 2. The torque beam 74 has a general square shaped cross-section with inboard and outboard side walls 82, 84, and a top and bottom wall 86, 88.

A bushing clamp assembly 92 is connected to the first end 76 of the torque beam 74. The bushing clamp assembly 92 is configured as a plate or strip shaped in the configuration of a cylinder 94. The cylinder 94 may be formed from a single plate or strip that is shaped as a cylinder, or it may be formed from two identical semi-circular sections welded together to form a cylinder, or it may be cast as a cylinder. An axial slot 96 is formed through one side of the cylinder 94 and a pair of flanges 98, 102 extend outward from the cylinder in the area of the slot. Three pairs of aligned holes are provided through the flanges 98, 102 and three nut and bolt fasteners 104 are provided through the pairs of holes. A pair of reinforcing gussets 106 extend between the top wall 86 of the torque beam and the exterior surface of the pivot bushing cylinder 94. An additional pair of reinforcing gussets 108 are provided extending between the bottom wall 88 of the torque beam and the exterior of the pivot bushing cylinder and one of the cylinder flanges 102. A third pair of gussets 112 reinforce the other flange 98. The first end 76 of the torque beam 74 is also secured to the cylinder 94 of the bushing clamp by welds 114 along the straight edges of the top and bottom walls 86, 88 of the torque beam, and by welds 116 along the semi-circular edges of the inboard and outboard side walls 82, 84 of the torque beam.

The cylinder 94 is shown connected to the first end of the torque beam 74 with the cylinder flanges 98, 102 positioned at about a 45° angle to the longitudinal axis of the torque beam. It should be understood that the angular orientation of the cylinder flanges 98, 102 may be altered so that they extend at other angles relative to the longitudinal axis of the torque beam or extend parallel with the longitudinal axis of the torque beam. The positioning of the cylinder flanges 98, 102 in most cases will depend on the particular structure of the torque beam 74 and hanger member 16, the positioning of the flanges being chosen to provide adequate access to the threaded fasteners 104 that close the cylinder 94 over the pivot bushing 44.

The cylinder 94 of the bushing clamp is resilient so that when the threaded fasteners 104 are removed from the flanges 98, 102, the cylinder causes the slot 96 to spring open. This increases the interior volume of the cylinder 94 and facilitates the insertion and removal of the pivot bushing 44 into and out of the cylinder. This in turn facilitates the assembly of the torque beam 74 on the pivot bushing 44 and permits the removal of the pivot bushing 44 from the torque beam 74 without damaging the bushing. The cylinder 94 is closed over the exterior surface 48 of the pivot bushing by reinserting the threaded fasteners 104 through the aligned holes of the flanges 98, 102 and tightening the fasteners to bring the flanges into engagement and substantially close the slot 96. This secures the bushing clamp cylinder 94 over the exterior surface of the pivot bushing.

With the bushing so secured to the first end of the torque beam 74, the bushing 44 and torque beam first end 76 are inserted between the inboard and outboard side walls 24, 26 of the hanger member 16. The holes 32, 34 in the hanger member side walls are aligned with the hole through the inner sleeve 58 at the center of the pivot bushing, and a bolt 118 is inserted through the aligned holes and is secured by a nut 122 to pivotally mount the torque beam 74 on the hanger member 16. As is best seen in FIG. 4, when the torque beam is torsionally twisted during operation of the vehicle suspension, the structure of the pivot bushing 44 permits the torque beam to twist relative to the hanger member 16 while reducing the torsional stress exerted on the torque beam.

An axle seat assembly 124 is connected to the second end 78 or the right end of the torque beam as viewed in FIG. 1. The axle seat assembly is generally comprised of an inboard side plate 126 and an outboard side plate 128. The inboard side plate 126 is provided with a first end 132 and a second end 134, and the outboard side plate 128 is provided with a first end 136 and a second end 138. Bends 142, 144 traverse the inboard and outboard side plates, respectively, and separate the first ends of the side plates from the second ends of the side plates.

Distal edges 146, 148 of the first ends of the inboard and outboard side plates, respectively, remote from their second ends, are secured to the inboard 82 and outboard 84 side walls of the torque beam 74 by welds along the distal edges. The welds secure the side plates 126, 128 to the inboard and outboard side walls 82, 84, respectively, of the torque beam 74 with the first ends 132, 136 of the side plates lying adjacent the inboard and outboard side walls of the torque beam and the second ends 134, 138 of the side plates spaced further apart than the first ends 132, 136 of the side plate. The transverse bends 142, 144 in the inboard and outboard side plates 132, 134 position the first and second ends of the inboard side plate 126 and outboard side plate 128 in staggered positions that are parallel to each other but are not coplanar. The relative positioning of the first and second ends of the side plates is best seen in FIG. 3.

The second ends 134, 138 of the inboard and outboard side plates, respectively, have semi-circular distal edges 152, 154 that engage over the vehicle axle 14. A pair of U-bolts 156, 158 engage around the underside of the vehicle axle 14 and project upward through pairs of holes (not shown) through substantially horizontally extending plates 162, 164 provided on the first ends 132, 136 of the inboard and outboard side plates 126, 128. The U-bolts are held in position by nuts 166 screw threaded on their projecting ends and thereby secure the vehicle axle 14 to the inboard and outboard side plates 126, 128 of the axle seat assembly.

Additional reinforcing gussets 168 are provided secured between the inboard and outboard side plates 126, 128 and the inboard and outboard horizontal plates 162, 164. Forward and rearward angled reinforcements 172, 174 are also provided secured between the underside of the torque beam 74 and the vehicle axle 14.

The weld connection of the inboard and outboard side plates 126, 128 to the inboard and outboard side walls of the torque beam 74 enable the side plates 126, 128 to flex as the vehicle axle 14 is displaced relative to the torque beam 74 during operation of the suspension system. The flexing movement permitted by the axle seat assembly 124 functions in the same manner as prior art axle seat assemblies connected to torque beams by bushings to reduce the torsional stress on the torque beam from normal operation of the suspension system.

Figure 5:
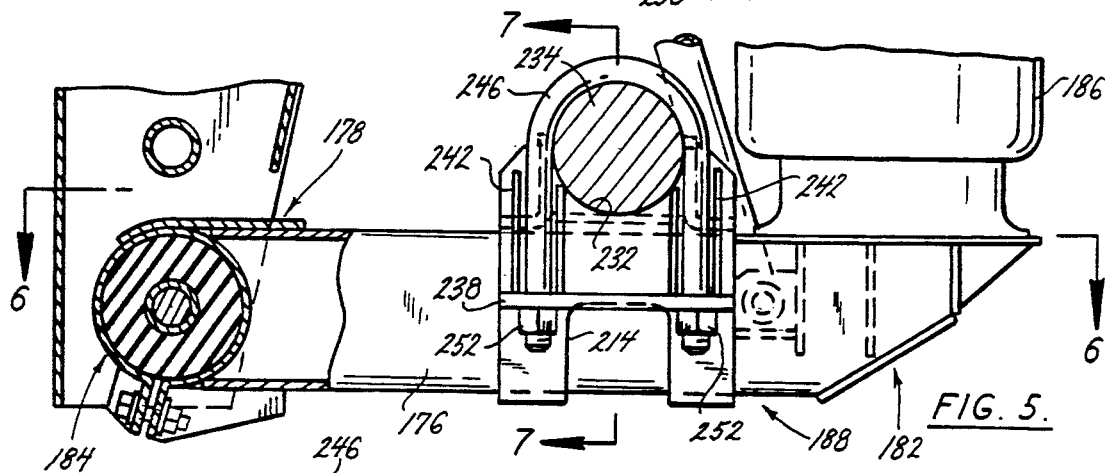
FIG. 5 is an elevation view partially in section of the torque beam assembly of the invention supporting an overslung vehicle axle.
Figure 7:
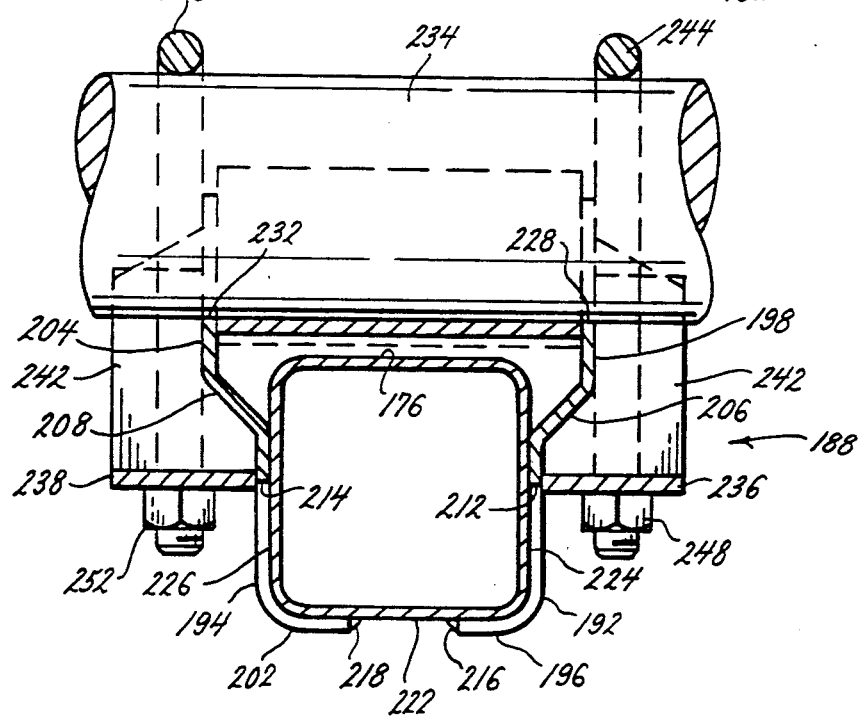
FIG. 7 is an elevation view in section of the axle seat assembly of the invention taken along the line 7—7 of FIG. 5.

FIGS. 5, 6 and 7 show an alternate embodiment of the torque beam assembly of the present invention employed in supporting an overslung vehicle axle. The torque beam 176 of the assembly is similar to the assembly of the first embodiment in that it has a substantially square cross-section and first and second ends 178, 182. A bushing clamp assembly 184 is connected to the first end 178 of the torque beam 176. The bushing clamp assembly 184 is substantially identical to the bushing clamp assembly described with reference to FIGS. 1-4 of the first embodiment of the invention and will not be further described here. An air spring 186 is connected between a top surface of the second end 182 of the torque beam and an underside of the vehicle chassis (not shown). The axle seat assembly 188 of the second embodiment of the torque beam assembly of the invention is positioned just forward of the air spring 186 on the torque beam 176.

Like the first embodiment of the invention, the axle seat assembly 188 of this embodiment of the invention is generally comprised of an inboard and an outboard side plate 192, 194. The inboard side plate 192 has first and second ends 196, 198, and the outboard side plate 194 has first and second ends 202, 204. The first ends 196, 202 of the inboard and outboard side plates 192, 194 are separated from their second ends 198, 204 by bends 206, 208 extending transversely across the side plates. The transverse bends 206, 208 position the second ends 198, 204 of the side plates 192, 194 further apart from each other than the first ends 196, 202 of the side plates when attached to the torque beam 176 as shown in FIG. 7.

The first ends 196, 202 of the inboard and outboard side plates 192, 194 are also provided with cut-out sections 212, 214. The cut-out sections 212, 214 extend from adjacent the transverse bends 206, 208 in the side plates, through to the distal edges 216, 218 of the first ends 196, 202 of the side plates. The cut-out sections 212, 214 enhance the flexibility of the axle seat assembly 188 and enable the axle seat assembly to function in much the same manner as prior art axle seat assemblies requiring one or two pivot bushings to connect the axle seat assemblies to torque beams.

The inboard and outboard side plates 192, 194 are secured to the torque beam 176 by welds between the distal edges of the first ends of the side plates 216, 218 and a bottom wall 222 of the torque beam. The first ends of the side plates 196, 202 lie flat against portions of the bottom wall 222 of the torque beam and then curve vertically upward to conform to and overlap bottom corners of the torque beam and portions of the inboard and outboard side walls 224, 226 of the torque beam. The inboard and outboard side plates 192, 194 then flair outward from the transverse bends 206, 208 in the side plates, and the second ends 198, 204 of the inboard and outboard side plates project further upward from the bends above the torque beam 276. Semi-circular notches 228, 232 are cut into the distal edges of the second ends 198, 204 of the inboard and outboard side plates. The notches 228, 232 are shaped to conform to and engage the outer circumference of the vehicle axle 234.

Substantially horizontal plates 236, 238 extend outward from the inboard and outboard side plates 192, 194. Each of the horizontal plates are reinforced by vertical gussets 242 and each are provided with a pair of holes (not shown) that receive the distal, threaded ends of U-bolts 244, 246. The U-bolts are positioned over the vehicle axle 234 and their distal threaded ends are inserted through the holes of the horizontal plates 236, 238. The U-bolts 244, 246 are tightened down over the axle 234 by nuts 248, 252 that secure the U-bolts over the overslung vehicle axle 234 and secure the axle to the axle seat assembly 188.

The above described configuration of the inboard and outboard axle seat assembly side plates 192, 194 and their weld connections to the bottom wall 222 of the torque beam 176 and the vehicle axle 234 permit the axle seat assembly 188 to flex as the vehicle axle 234 is displaced relative to the torque beam 176 during operation of the suspension system. The flexing movement permitted by the axle seat assembly 188 functions in much the same manner as prior art axle seat assemblies connected to torque beams by bushings to reduce the torsional stress exerted on the torque beam 176 by movement of the vehicle axle 234 during normal suspension system operation.

Although the underslung and overslung vehicle axle embodiments of the invention have been described and shown in FIGS. 1-7 as being connected to the axle seat assemblies of the torque beam assembly of the invention by U-bolts, it should also be clear that the underslung and overslung vehicle axles may alternately be welded to the axle seat assemblies of the invention in lieu of the U-bolt connections. FIGS. 8-11 show further embodiments of the invention in which an underslung vehicle axle and an overslung vehicle axle are secured to the axle seat assemblies of the torque beam assembly of the invention by welds.

Figure 8:
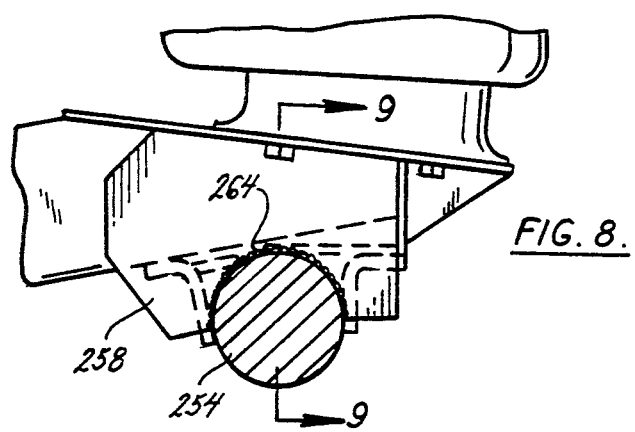
FIG. 8 is a side elevation view of the torque beam assembly of the present invention showing an alternate embodiment of the axle seat assembly welded to an underslung vehicle axle.
Figure 9:
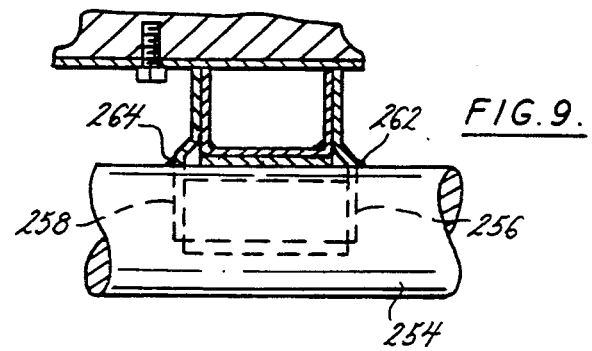
FIG. 9 is an elevation view in section of the axle seat assembly taken along the line 9—9 of FIG. 8.

FIGS. 8 and 9 show an underslung vehicle axle 254 secured to the second ends 256, 258 of the inboard and outboard side plates of an axle seat assembly for an underslung vehicle axle. The second ends of the inboard and outboard side plates 256, 258 are secured to the vehicle axle 254 by welds 262, 264 in lieu of U-bolt connections. The horizontal plates and their reinforcing gussets required for the U-bolt connections are not needed when connecting the axle seat assembly to the vehicle axle by welds and are not shown in FIGS. 8 and 9.

Figure 10:
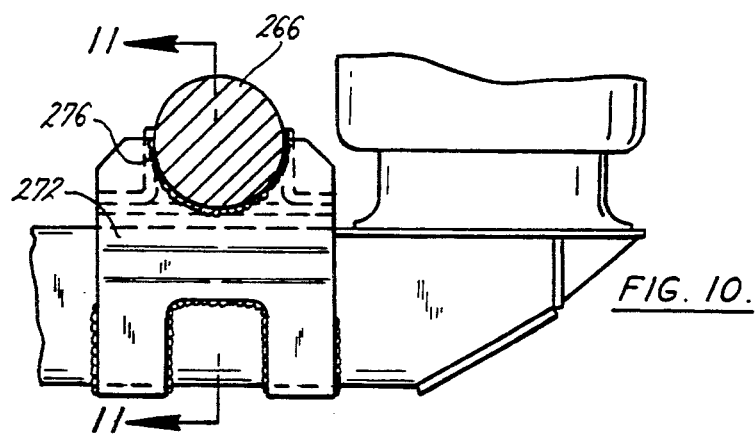
FIG. 10 is a side elevation view of the torque beam assembly of the present invention showing an alternate embodiment of the axle seat assembly welded to an overslung vehicle axle.
Figure 11:
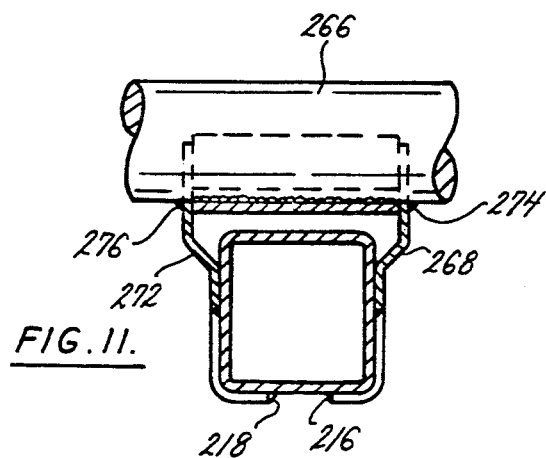
FIG. 11 is an elevation view in section of the axle seat assembly taken along the line 11—11 of FIG. 10.

FIGS. 10 and 11 show an embodiment of the axle seat assembly of the invention in which an overslung vehicle axle 266 is secured to the second ends of inboard and outboard side plates 268, 272 of the axle seat assembly by welds 274, 276. The horizontal plates and their reinforcing gussets required for the U-bolt connections between the vehicle axle and the axle seat assembly are not needed when the vehicle axle is welded to the side plates of the axle seat assembly and are not shown in FIGS. 10 and 11.

The remaining structure of the axle seat assemblies shown in FIGS. 8-11 is substantially identical to that of the axle seat assemblies shown and described with references to FIGS. 1-7.

While the present invention has been described by reference to specific embodiments, it should be understood that modifications and variations of the invention may be constructed without departing from the scope of the invention defined in the following claims.

What is claimed is:

1. A torque beam assembly for a suspension system of a vehicle having a chassis and at least one axle, the torque beam assembly comprising:
a longitudinally extending torque beam having a first and a second end, the first end of the torque beam being adapted to be connected to a vehicle axle and the second end of the torque beam being connected to a bushing clamp, the bushing clamp being a tubular cylinder with an axial slot extending through a side of the cylinder, the cylinder being resilient and biasing the slot open enabling the insertion of a bushing into the cylinder, and the cylinder being adapted to substantially close the slot to engage the cylinder around the bushing and secure the bushing clamp on the bushing, the cylinder having an outer circumferential surface and the second end of the torque beam being connected to the outer circumferential surface, and at least two pairs of planar vertically projecting reinforcing gussets connected on end between the circumferential surface and the second end of the torque beam, each gusset pair of the two pair being positioned on an opposite side of the torque beam.

2. The torque beam of claim 1, wherein:
first and second flanges project from the cylinder at opposite sides of the slot, the flanges being adapted to be connected together to substantially close the slot of the cylinder, and at least one of the two pairs of gussets being connected to one of the first and second flanges.

3. The torque beam of claim 1, wherein:
an axle seat means adapted to support a vehicle axle is connected to the first end of the torque beam.

4. The torque beam of claim 3, wherein:
the axle seat means includes a pair of laterally spaced longitudinally parallel side plates, each of the side plates having first and second ends, the first ends of the side plates are connected to the first end of the torque beam, and the second ends of the side plates extend from the torque beam and are laterally spaced further apart from each other than are the first ends of the side plates.

5. The torque beam of claim 4, wherein:
the second ends of the side plates are adapted to be connected to an underlsung vehicle axle.

6. The torque beam of claim 4, wherein:
the second ends of the side plates are adapted to be connected to an overslung vehicle axle.

7. The torque beam of claim 4, wherein:
the first ends of the side plates have distal edges remote from the second ends of the side plates, and the side plates are connected to the torque beam solely by welds between the distal edges of the first ends of the side plates and the torque beam.

8. The torque beam of claim 1, wherein:
a pair of laterally spaced side plates, each having first and second ends, are connected to the first and of the torque beam, the first ends of the side plates are connected directly to the torque beam and the second ends of the side plates are adapted to be connected directly to a vehicle axle, the first ends of the side plates have a first lateral spacing therebetween and the second ends of the side plates have a second lateral spacing therebetween, the second spacing being greater than the first spacing.

9. The torque beam of claim 8, wherein:
the first ends of the side plates have distal edges remote from the second ends of the side plates, and the first ends of the side plates are connected to the torque beam solely by welds between the distal edges of the first end of the side plates and the torque beam.

10. A torque beam assembly for a suspension system of a vehicle having a chassis and at least one axle, the torque beam assembly comprising:
a longitudinally extending torque beam having a first and a second end, the first end of the torque beam being adapted to be connected to a vehicle chassis;
a pair of longitudinally parallel side plates each having a first and a second end, the first ends of the side plates having distal edges remote from the second ends of the side plates, and the first ends of the side plates being connected to the first end of the torque beam solely by welds between the distal edges of the first ends of the side plates and the first end of the torque beam, the first ends of the side plates are connected to the first end of the torque beam on opposite sides of the torque beam, and the second ends of the side plates project away from the torque beam and are laterally spaced further apart from each other than are the opposite sides of the torque beam.

11. The torque beam of claim 10, wherein:
the second ends of the side plates are adapted to be connected directly to a vehicle axle.

12. The torque beam of claim 10, wherein:
the first ends of the side plates are spaced apart from each other by the first end of the torque beam, and the second ends of the side plates are spaced further apart from each other than the first ends of the side plates.

13. The torque beam of claim 10, wherein:
the second end of the torque beam is connected to a bushing clamp, the bushing clamp is configured as a strip of material with opposite first and second ends that is shaped in a configuration of a tubular cylinder with an axial slot extending through a side of the cylinder, the axial slot is formed by the first and second ends of the strip, the slot is resiliently biased open by the tubular configuration of the cylinder, enabling the insertion of a bushing into the cylinder, and the slot is adapted to be substantially closed with the first and second ends of the strip engaging each other to engage the cylinder around the bushing and secure the bushing clamps on the bushing.

14. A torque beam assembly for a suspension system of a vehicle having a chassis and at least one axle, the torque beam assembly comprising:
a pivot bushing adapted to be supported on the vehicle chassis;
a torque beam having a first and a second end, the first end of the torque beam is adapted to be connected to the vehicle axle and the second end of the torque beam is connected to a bushing clamp, the bushing clamp is configured as a strip with opposite first and second ends that is shaped in a configuration of a tubular cylinder with an axial slot extending through a side of the cylinder, the axial slot is formed by the first and second ends of the strip, the slot is resiliently biased open by the tubular configuration of the cylinder, enabling the positioning of the cylinder over the pivot bushing, and the slot is adapted to be substantially closed with the first and second ends of the strip engaging each other to engage the cylinder around the pivot bushing and secure the bushing clamp on the pivot bushing, the cylinder having a outer circumferential surface and the second end of the torque beam being connected to the outer circumferential surface, a first pair of planar vertically projecting reinforcing gussets is connected on end between the outer circumferential surface and a top surface of the torque beam, and a second pair of planar vertically projecting reinforcing gussets is connected on end between the outer circumferential surface and a bottom surface of the torque beam.

15. The torque beam of claim 14, wherein:
the pivot bushing has a cylindrical configuration with first and second end walls, and at least one trough recess is provided in each of the first and second end walls.

16. The torque beam of claim 15, wherein:
a pair of arcuate trough recesses are provided in each of the first and second end walls of the pivot bushing, and a plurality of cavities extend into the pivot bushing from each of the trough recesses.

* * * * *